No. 749,803. PATENTED JAN. 19, 1904.
W. J. PATTERSON.
CONVEYER.
APPLICATION FILED JUNE 9, 1902.
NO MODEL. 3 SHEETS—SHEET 3.
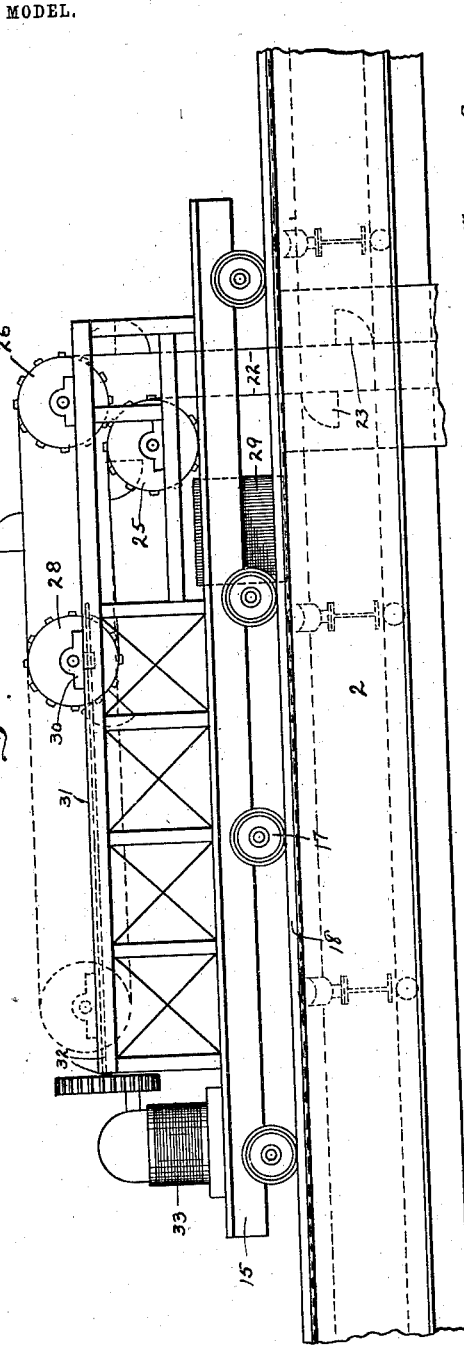
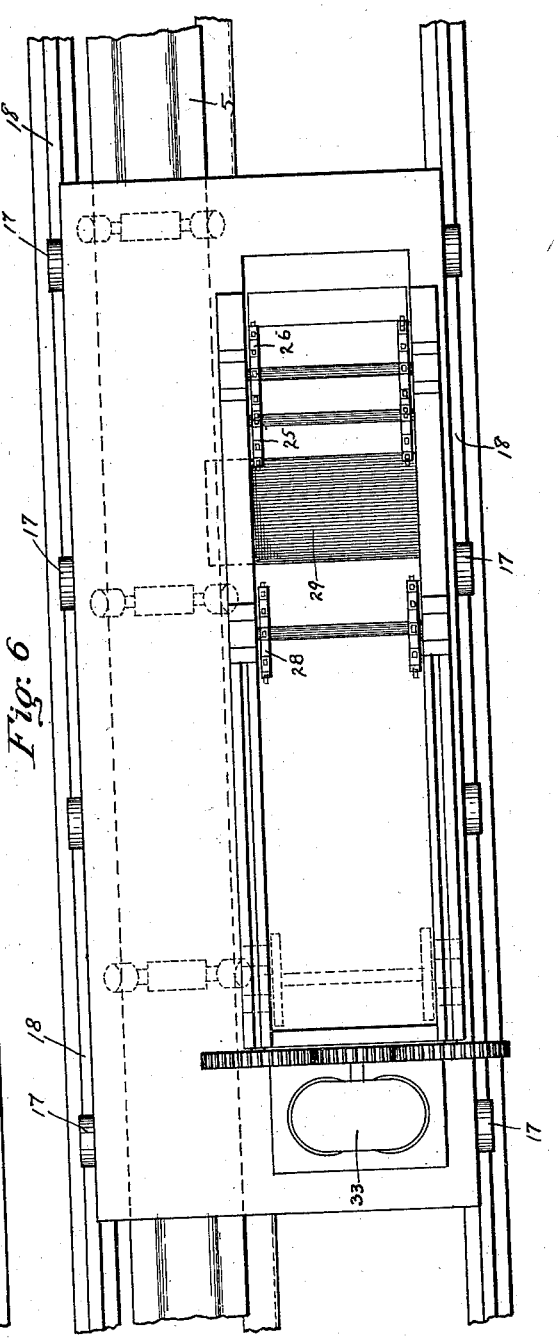

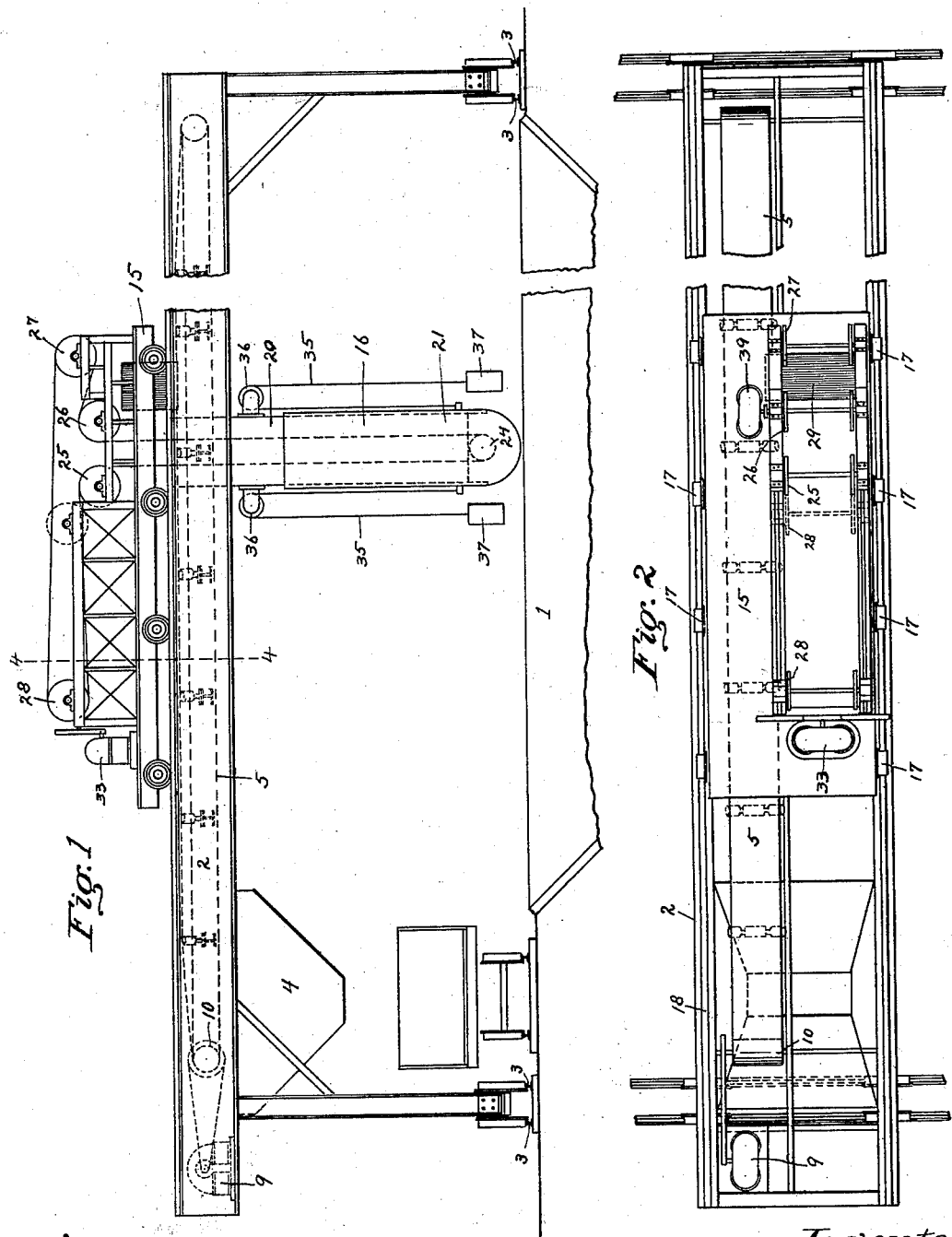

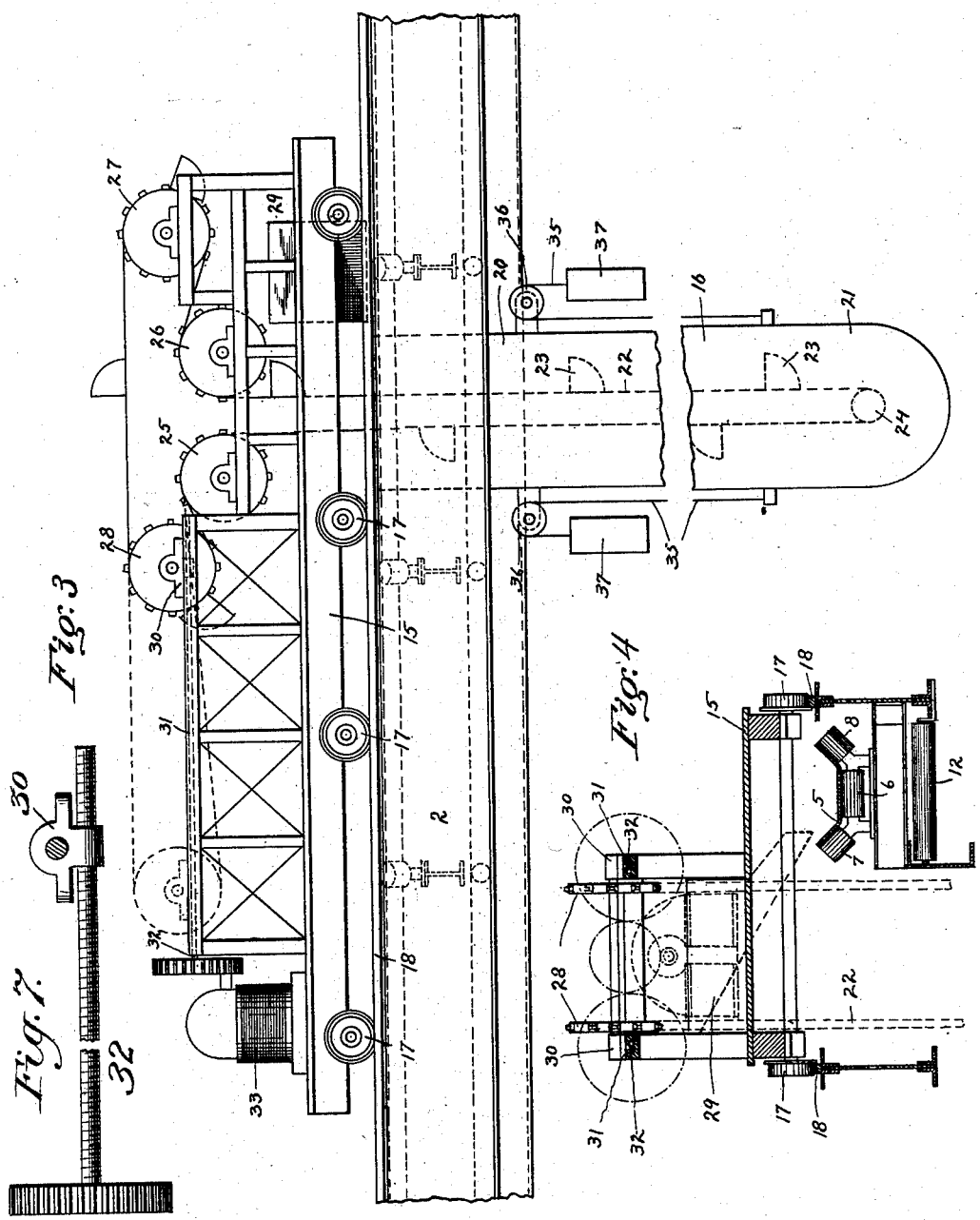

No. 749,803. Patented January 19, 1904.

UNITED STATES PATENT OFFICE.

WILLIAM J. PATTERSON, OF PITTSBURG, PENNSYLVANIA.

CONVEYER.

SPECIFICATION forming part of Letters Patent No. 749,803, dated January 19, 1904.

Application filed June 9, 1902. Serial No. 110,795. (No model.)

*To all whom it may concern:*

Be it known that I, WILLIAM J. PATTERSON, a resident of Pittsburg, in the county of Allegheny and State of Pennsylvania, have invented a new and useful Improvement in Conveyers; and I do hereby declare the following to be a full, clear, and exact description thereof.

My invention relates to elevating and conveying mechanism; and its object is to provide mechanism for this purpose whereby material can be easily removed from large storage bins or reservoirs or from any storage place of extended area.

To this end it comprises, generally stated, a movable bridge or crane having a transverse conveyer thereon, together with a carriage or trolley moving on said bridge or crane and carrying an extensible elevator-leg, which will elevate the material from the place of storage and deposit it in the conveyer on the bridge, whereby it is carried to its point of destination.

In the accompanying drawings, Figure 1 is a side elevation of my hoisting and conveying apparatus. Fig. 2 is a plan view of the same. Fig. 3 is an enlarged side view of a portion of the apparatus. Fig. 4 is a cross-section on the line 4 4, Fig. 1. Fig. 5 is a side view of a modification. Fig. 6 is a plan view of the same, and Fig. 7 is a detail view of the means for lengthening and shortening the conveyer.

My conveyer and elevator has been designed especially for removing coal and similar material from large storage-bins or other storage places of large area, and as it can be illustrated as well when applied to such use I will so describe it, although it is to be understood that it is not limited to this use, but may be used for any purpose wherein material is to be removed from a stored mass covering a considerable area.

In the drawings the material which is to be removed is stored in the area 1 and the elevating and conveying mechanism is made movable in all directions, so as to reach each and all portions of the storage area. The elevating and conveying mechanism comprises a suitable traveling bridge or crane 2, which is mounted or moved in one direction, say longitudinally, over the storage area. This longitudinal movement may be secured by mounting the bridge or crane upon suitable ways or tracks, such as shown at 3, extending longitudinally of the storage area, and said bridge or crane will be of sufficient length to extend across the storage area. On one end of this bridge or crane suitable means will be provided for delivering the coal or other material to its point of destination, this means being shown as a hopper 4, which is adapted to discharge its contents to any suitable place—such, for instance, as a car or the like placed underneath said hopper. A transverse conveyer is mounted on the bridge for carrying the coal or other material to and depositing the same in the hopper 4. Any suitable conveyer for this purpose may be used; but I prefer to use a belt conveyer 5, having its upper reach supported by three rollers 6, 7, and 8 placed in angular relation, as shown in Fig. 4, so as to hold the belt in substantially trough form. This conveyer will be driven in any suitable way—such, for instance, as from an electric motor 9, mounted on the bridge or crane and connected by suitable gearing to one of the end pulleys 10, over which said belt conveyer passes. The lower reach of said belt conveyer is supported at suitable intervals by idle rollers 12.

Mounted on the bridge 2 is a transversely-moving carriage or trolley 15, which carries an elevator 16, projecting downwardly to the material in the storage area 1. The carriage 15 is mounted on suitable wheels 17, running on tracks 18 on the bridge, and may be moved along the same in any suitable manner, such as by a motor mounted on the carriage and connected to the wheels thereof, so as to drive the same as a traction-carriage. The elevator 16 must be made extensible, so as to reach material at different heights. Preferably it is composed of telescoping tubes 20 and 21, which inclose chains 22, carrying elevator-buckets 23. The bucket-chains pass over suitable guide-wheels 24, mounted in the lower end of the tube 21, and over two sets of guide-wheels 25 and 26, mounted on the carriage 15 on one side, and over two other sets of guide-wheels 27 and 28, mounted on said carriage on the other side. A hopper or chute 29 is placed on the carriage 15 in proper position to receive the coal or other material from the elevator and discharge the same onto the belt conveyer 5. The chain-wheels 28 are movable in any suitable manner—as, for instance, by being mounted on a slide or carriage 30, moving in suitable ways 31 on the carriage—which slide may be moved on the ways by any suitable mechanism—such, for instance, as by screws 32, driven from an electric motor 33, mounted on the carriage 15. By means of these screws or similar mechanism the wheels 28 can be moved, as indicated in dotted lines, Fig. 1, thus shortening or lengthening the depending portion of the bucket-chains. The shortening of the chains will raise the lower tube 21 and cause it to telescope on the tube 20, thus shortening the elevator, and by lengthening said chains the lower tube will by its weight drop down, thus extending the elevator and keeping the bucket-chains taut. In this way the elevator can be extended or shortened as necessary in order to reach entirely to the bottom of the storage area. The lower tube 21 will preferably be counterbalanced to some extent, as by having attached thereto cords or cables 35, passing over sheaves 36, mounted on a stationary part of the elevator and provided with the counterbalancing-weights 37. The elevator-chains will be driven by any suitable mechanism—such, for instance, as from an electric motor 39, mounted on the carriage and connected by any suitable gearing to one set of wheels, such as the wheels 26. These chains, however, might be driven from the motor 33 by using suitable connecting gearing and clutches.

The elevator shown in Fig. 5 is exactly the same as that shown in the other figures, except that the guide-wheels 27 are dispensed with, the wheels 26 being placed higher in order to serve the function not only of the wheels 26 but also of the wheels 27 in Fig. 3. The hopper or chute 29 is in this case placed on the opposite side of the elevator. This construction has the advantage of shortening up the carriage or trolley 15.

In the use of my apparatus the elevator is brought over the desired portion of the storage area by moving the bridge or crane 2 longitudinally and then moving the carriage 15 transversely on said bridge. In this manner all parts of the storage area can be reached. As the elevator is extensible, it can be made to reach material at any height in the storage area. The transverse conveyer 5 is of course kept continuously running and the bucket-chains are also kept practically in constant operation and serve to elevate the material from the storage area and deposit the same in the hopper or chute 29, which delivers it to the transverse conveyer 5, and this in turn delivers it to the hopper or chute 4. As material in any part of the storage area is being reduced the slide or carriage 30 is gradually moved from the dotted-line position (shown in Figs. 3 and 5) to the full-line position, thus allowing the tube 21 to fall by gravity and extending the length of the elevator-leg.

By the arrangement described material can be removed from any portion of a storage place of large area and at any height therein and with a minimum amount of labor.

What I claim as my invention, and desire to secure by Letters Patent, is—

1. In hoisting apparatus, the combination of a traveling crane or bridge, and a telescoping elevator carried thereby and movable along said bridge.

2. In hoisting apparatus, the combination with a bridge, a transverse conveyer thereon, and an extensible elevator movable along the bridge and arranged to deliver the material to the transverse conveyer.

3. In hoisting apparatus, the combination with a traveling crane or bridge, of a transverse conveyer thereon, and an extensible elevator mounted to move bodily along the bridge or crane and arranged to deliver the material to the transverse conveyer.

4. In hoisting apparatus, the combination with a traveling bridge or crane, a transverse conveyer thereon, and a telescoping elevator-leg mounted on and movable along the bridge and arranged to deliver the material to the transverse conveyer.

5. In hoisting apparatus, the combination with a movable bridge or crane, a hopper at one end thereof, a transverse conveyer on the bridge leading to the hopper, a trolley movable on the bridge, and an elevator carried by said trolley and arranged to deliver the coal to the transverse conveyer.

6. In hoisting apparatus, the combination with a movable bridge or crane, an elevator carried by and movable along said bridge, said elevator comprising telescoping members, elevator-chains therein, and means for lengthening and shortening the depending portions of said chains.

7. In hoisting apparatus, the combination with a movable bridge or crane, an elevator carried by and movable along said bridge, said elevator comprising telescoping members, means for extending or retracting said members, and a counterbalance for the movable member.

8. In hoisting apparatus, the combination with a movable bridge or crane, an elevator carried by said bridge, said elevator comprising telescoping members, an endless conveyer therein, guide-wheels over which said conveyer passes, and means for moving one set of said guide-wheels whereby the depending portion of the endless conveyer is shortened or lengthened.

9. In hoisting apparatus, the combination with a movable bridge or crane, an elevator carried thereby, said elevator comprising telescoping members, an endless conveyer in said members, guide-wheels over which said conveyer passes, a carriage in which one set of said guide-wheels are mounted, and a motor and gearing for moving said slide, whereby the depending portion of said conveyer is lengthened and shortened.

10. Hoisting apparatus comprising telescoping members, an endless conveyer in said members, guide-wheels at the lower end of the lower telescoping member around which said conveyer passes, guide-wheels on the stationary part of the apparatus over which said conveyer also passes, one set of said last-named guide-wheels being movable so as to lengthen and shorten the depending portion of said endless conveyer.

11. Hoisting apparatus comprising telescoping members, an endless conveyer, guide-wheels over which said conveyer passes, one set of said guide-wheels being located at the lower end of the lower telescoping member, and mechanisim for moving one set of said guide-wheels, whereby the telescoping members are caused to move one on the other.

In testimony whereof I, the said WILLIAM J. PATTERSON, have hereunto set my hand.

WILLIAM J. PATTERSON.

Witnesses:
   G. C. RAYMOND,
   ROBERT C. TOTTEN.